United States Patent
Usuda et al.

(10) Patent No.: US 7,756,020 B2
(45) Date of Patent: Jul. 13, 2010

(54) RADIO RESOURCE CONTROL METHOD, RADIO NETWORK CONTROLLER, AND RADIO BASE STATION

(75) Inventors: Masafumi Usuda, Yokosuka (JP); Anil Umesh, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1150 days.

(21) Appl. No.: 11/350,035

(22) Filed: Feb. 9, 2006

(65) Prior Publication Data

US 2006/0194585 A1 Aug. 31, 2006

(30) Foreign Application Priority Data

Feb. 9, 2005 (JP) ............................. 2005-033685
Feb. 7, 2006 (JP) ............................. 2006-029441

(51) Int. Cl.
*G01R 31/08* (2006.01)
*H04W 4/00* (2009.01)
*H04W 72/00* (2009.01)
*H04J 3/16* (2006.01)
*H04M 1/00* (2006.01)

(52) U.S. Cl. ........................ 370/229; 370/328; 370/468; 455/452.1; 455/560

(58) Field of Classification Search ................. 370/329, 370/230, 232, 468, 328, 229; 455/452.1, 455/560, 452.2, 522, 509, 517
See application file for complete search history.

(56) References Cited

U.S. PATENT DOCUMENTS

| | | | |
|---|---|---|---|
| 7,142,548 B2 * | 11/2006 | Fong et al. ................ | 370/395.4 |
| 7,353,025 B2 * | 4/2008 | Ahn et al. ................... | 455/434 |
| 7,539,165 B2 * | 5/2009 | Toskala et al. .............. | 370/335 |
| 2002/0021673 A1 * | 2/2002 | Agin et al. .................. | 370/252 |
| 2002/0114280 A1 * | 8/2002 | Yi et al. ...................... | 370/235 |
| 2003/0073443 A1 * | 4/2003 | Bae et al. .................... | 455/450 |
| 2003/0157941 A1 * | 8/2003 | Obata et al. ................. | 455/452 |

(Continued)

FOREIGN PATENT DOCUMENTS

EP 1453225 A1 * 9/2004

(Continued)

OTHER PUBLICATIONS

"Cell level rate control and autonomous transmission with rate ramping", NTT DoCoMo, Jun. 21-24, 2004, 5 pages.

(Continued)

*Primary Examiner*—Steven H Nguyen
*Assistant Examiner*—Candal Elpenord
(74) *Attorney, Agent, or Firm*—Oblon, Spivak, McClelland, Maier & Neustadt, L.L.P.

(57) ABSTRACT

A radio resource control method in a mobile communication system for determining a transmission rate of user data transmitted by a mobile station via an uplink based on a maximum allowable transmission rate, include: notifying, at a radio network controller, an averaging period or a forgetting factor to a radio base station; calculating, at the radio base station, an averaging value of the maximum allowable transmission rates or an averaging value of parameters relating to the maximum allowable transmission rate, based on the averaging period or the forgetting factor; signaling, at the radio base station, the calculated averaging value to the radio network controller; and controlling, at the radio network controller, a radio resource in the radio base station, based on the signaled averaging value.

6 Claims, 8 Drawing Sheets

U.S. PATENT DOCUMENTS

| | | |
|---|---|---|
| 2004/0160914 A1 | 8/2004 | Sarkar |
| 2005/0018656 A1* | 1/2005 | Rudolf et al. ............... 370/352 |
| 2005/0041615 A1* | 2/2005 | Hayashi et al. ............. 370/328 |
| 2005/0220052 A1* | 10/2005 | Uehara et al. ............... 370/331 |
| 2005/0249148 A1* | 11/2005 | Nakamata et al. ........... 370/328 |
| 2006/0189323 A1* | 8/2006 | Usuda et al. ................ 455/453 |
| 2006/0209692 A1* | 9/2006 | Usuda et al. ................ 370/232 |
| 2006/0215602 A1* | 9/2006 | Usuda et al. ................ 370/328 |

FOREIGN PATENT DOCUMENTS

| | | |
|---|---|---|
| EP | 1 655 909 A1 | 5/2006 |
| WO | WO 2004/088899 A2 | 10/2004 |
| WO | WO 2005/112296 A2 | 11/2005 |

OTHER PUBLICATIONS

Samsung, "Node B Controlled Scheduling", 3GPP TSG-RAN WG1 Meeting # 38, Prague, Czech Republic, Aug. 16, 2004, XP002367155, pp. 1-10.

* cited by examiner

RADIO RESOURCE CONTROL METHOD, RADIO NETWORK CONTROLLER, AND RADIO BASE STATION

CROSS REFERENCE TO RELATED APPLICATION

This application is based upon and claims the benefit of priority from the prior Japanese Patent Application No. P2005-033685, filed on Feb. 9, 2005; the entire contents of which are incorporated herein by reference.

BACKGROUND OF THE INVENTION

1. Field of the Invention

The present invention relates to a radio resource control method in a mobile communication system for determining a transmission rate of user data transmitted by a mobile station via an uplink based on a maximum allowable transmission rate, a radio network controller, and a radio base station.

And, the present invention relates to a radio resource control method in a mobile communication system for automatically increasing a transmission rate of user data transmitted by a mobile station via an uplink to a maximum allowable transmission rate, a radio network controller, and a radio base station.

2. Description of the Related Art

In a conventional mobile communication system, in an uplink from a mobile station UE to a radio base station Node B, a radio network controller RNC is configured to determine a transmission rate of a dedicated channel, in consideration of radio resources of the radio base station Node B, an interference volume in an uplink, transmission power of the mobile station UE, transmission processing performance of the mobile station UE, a transmission rate required for an upper application, and the like, and to notify the determined transmission rate of the dedicated channel by a message of a layer-3 (Radio Resource Control Layer) to both of the mobile station UE and the radio base station Node B.

Here, the radio network controller RNC is provided at an upper level of the radio base station Node B, and is an apparatus configured to control the radio base station Node B and the mobile station UE.

In general, data communications often cause burst traffic compared with voice communications or TV communications. Therefore, it is preferable that a transmission rate of a channel used for the data communications is changed fast.

However, as shown in FIG. 1, the radio network controller RNC integrally controls a plurality of radio base stations Node B in general. Therefore, in the conventional mobile communication system, there has been a problem that it is difficult to perform fast control for changing of the transmission rate of channel (for example, per approximately 1 through 100 ms), due to processing load, processing delay, or the like.

In addition, in the conventional mobile communication system, there has been also a problem that costs for implementing an apparatus and for operating a network are substantially increased even if the fast control for changing of the transmission rate of the channel can be performed.

Therefore, in the conventional mobile communication system, control for changing of the transmission rate of the channel is generally performed on the order from a few hundred ms to a few seconds.

Accordingly, in the conventional mobile communication system, when burst data is generated as shown in FIG. 2(a), the data are transmitted by accepting low-speed, high-delay, and low-transmission efficiency as shown in FIG. 2(b), or, as shown in FIG. 2(c), by reserving radio resources for high-speed communications to accept that radio bandwidth resources in an unoccupied state and hardware resources in the radio base station Node B are wasted.

It should be noted that both of the above-described radio bandwidth resources and hardware resources are applied to the vertical radio resources in FIGS. 2(b) and 2(c).

Therefore, the 3rd Generation Partnership Project (3GPP) and the 3rd Generation Partnership Project 2 (3GPP2), which are international standardization organizations of the third generation mobile communication system, have discussed a method for controlling radio resources at high speed in a layer-1 and a media access control (MAC) sub-layer (a layer-2) between the radio base station Node B and the mobile station UE, so as to utilize the radio resources effectively. Such discussions or discussed functions will be hereinafter referred to as "Enhanced Uplink (EUL)".

Radio resource control methods that have been discussed in the "Enhanced Uplink" can be broadly categorized into three as follows. The radio resource control methods will be briefly described below.

First, a radio resource control method that is referred to as "Time & Rate Control" has been discussed.

In such a radio resource control method, a radio base station Node B determines a mobile station UE which can transmit user data and a transmission rate of user data per a predetermined timing, so as to signal information relating to a mobile station ID as well as the transmission rate of user data (or a maximum allowable transmission rate of user data).

The mobile station UE that is designated by the radio base station Node B transmits user data at the predetermined timing and the transmission rate (or within a range of the maximum allowable transmission rate).

Second, a radio resource control method that is referred to as "Rate Control per UE" has been discussed.

In such a radio resource control method, if there is user data that should be transmitted to the radio base station Node B, each mobile station UE can transmit the user data. However, the maximum allowable transmission rate of the user data, which is determined by the radio base station Node B and signaled to each mobile station UE for each transmission frame or each of a plurality of transmission frames, is used.

Here, when the maximum allowable transmission rate is signaled, the radio base station Node B signals the maximum allowable transmission rate itself, or a relative value thereof (for example, binary of Up command and Down command), at this timing.

Third, a radio resource control method that is referred to as "Rate Control per Cell" has been discussed.

In such a radio resource control method, a radio base station Node B signals a transmission rate of user data, which is common among mobile stations UE in communication, or information needed to calculate the transmission rate, and each mobile station UE determines a transmission rate of user data based on the received information.

Ideally, the "Time & Rate Control", and the "Rate Control per UE" can be the best control methods for improving radio capacity in an uplink.

However, a transmission rate of user data has to be granted (or allocated) after data volume stored in buffers of the mobile station UE, transmission power in the mobile station UE, or the like are grasped. Therefore, there has been a problem that control load on the radio base station Node B is increased.

In addition, in these radio resource control methods, there has been a problem that overhead becomes larger by exchanges of control signals.

On the other hand, in the "Rate Control per Cell", there is an advantage in that control load on the radio base station Node B is small since the radio base station Node B signals information which is common in cells, and each mobile station UE autonomously seeks the transmission rate of user data based on the received information.

However, the radio base station Node B has to be configured in such a manner that the user data in the uplink from any mobile station UE can be received. Therefore, there has been a problem that an apparatus size of radio base station Node B becomes large to effectively utilize the radio capacity of the uplink.

Accordingly, there has been proposed, for example, a scheme (Autonomous ramping method) that the mobile station UE increases the transmission rate of user data from a pre-notified initial transmission rate in accordance with predetermined rules so that excessive allocation of radio capacity by the radio base station Node B can be prevented, thereby preventing increase of the apparatus size of radio base station Node B.

In such a scheme, a radio base station Node B determines a maximum allowable transmission rate (or parameter relating to the maximum allowable transmission rate) based on hardware resources and radio bandwidth resources (for example, an interference volume in an uplink) in each cell, so as to control the transmission rate of user data in communicating mobile stations UE. Detailed descriptions of a control scheme based on hardware resources and a control scheme based on an interference volume in an uplink will be given below.

In the control scheme based on the hardware resources, a radio base station Node B is configured to signal a maximum allowable transmission rate to a mobile station UE connected to a cell under the control thereof.

The radio base station Node B lowers the maximum allowable transmission rate so as to avoid shortage of the hardware resources when the transmission rate of user data in the mobile station UE connected to the cell under the control thereof is increased and the hardware resources are insufficient.

On the other hand, the radio base station Node B again increases the maximum allowable transmission rate when the space of the hardware resources become larger at a time of completion of user data transmission in the mobile station UE connected to the cell under the control thereof, or the like.

In addition, in the control scheme based on the interference volume in the uplink, a radio base station Node B is configured to signal a maximum allowable transmission rate to a mobile station UE connected to a cell under the control thereof.

When the transmission rate of user data in the mobile station UE connected to the cell under the control of a radio base station Node B increases and a measured interference volume (for example, a measured noise rise) in the uplink exceeds an allowable value (for example, a maximum allowable noise rise), the radio base station Node B lowers the maximum allowable transmission rate so that the interference volume in the uplink can be within a range of the allowable value (see, FIG. 3).

On the other hand, when the interference volume (for example, the noise rise) in the uplink is within a range of the allowable value (for example, the maximum allowable noise rise), thereby having a space, at the time of completion of user data transmission in the mobile station UE connected to the cell under the control of the radio base station Node B, or the like, the radio base station Node B again increases the maximum allowable transmission rate (see, FIG. 3).

Further, the radio network controller RNC controls radio resources so as to perform a call admission control processing, a handover processing, or the like.

The conventional radio network controller RNC is configured to perform the call admission control processing or the handover processing based on the interference volume in the uplink.

However, there has been a problem that when EUL is applied, the interference volume in the uplink is always controlled so as to reach to the allowable value, therefore the conventional radio network controller RNC can not perform the call admission control processing or the handover processing simply based on the interference volume which can be utilized in the uplink.

To solve the above-described problem, the method that the radio network controller RNC measures the reception power of Enhanced Uplink Channel (E-DPCH: Enhanced Dedicated Physical Channel), and performs the call admission control processing or the handover processing based on the measured reception power, is known.

However, in the above-described method, the radio network controller RNC can not grasp an accurate maximum allowable transmission rate which is signaled by the radio base station Node B, therefore the radio network controller RNC can not perform the high quality radio resource control.

In order to solve the above-described problem, the method that the radio network controller RNC performs the high quality radio resource control by acquiring the maximum allowable transmission rate which is signaled by the radio base station Node B, has been suggested.

However, in the above-described method, there has been a problem that the radio network controller RNC is configured to acquire the instantaneous maximum allowable transmission rate which is signaled by the radio base station Node B, therefore the radio resource control performed by the radio network controller RNC can be insufficient control.

In other words, there has been a problem that when the call admission control processing or the handover processing or the like is performed for example, per few hundred ms or per few ms, the instantaneous maximum allowable transmission rates acquired by the radio network controller RNC are fluctuating frequently. Therefore, the radio network controller RNC can not perform the high quality radio resource control.

Further, there has been a problem that when the radio network controller RNC performs averaging the instantaneous maximum allowable transmission rates signaled per Transmission Time Interval (TTI), which is acquired by the radio base station Node B, the traffic between the radio network controller RNC and the base station Node B increase, and the network cost are required.

Furthermore, there has been a problem that when the radio network controller RNC is configured to perform the above-described averaging, the control load in the radio network controller RNC is increased.

BRIEF SUMMARY OF THE INVENTION

The present invention has been made considering the problems, and its object is to provide a radio resource control method, a radio network controller and a radio base station which enable a high quality radio resource control without increasing traffic volume between a radio network controller RNC and a radio base station Node B, and control load in the radio network controller RNC.

A first aspect of the present invention is summarized as a radio resource control method in a mobile communication system for automatically increasing a transmission rate of user data transmitted by a mobile station via an uplink to a maximum allowable transmission rate, including: notifying, at a radio network controller, an averaging period or a forgetting factor to a radio base station, and calculating, at the radio base station, an averaging value of the maximum allowable transmission rates or an averaging value of the parameters relating to the maximum allowable transmission rate based on the averaging period and the forgetting factor, signaling, at the radio base station, calculated averaging value to the radio network controller, and controlling, at the radio network controller, the radio resource in the radio base station based on the averaging value signaled from the radio base station.

A second aspect of the present invention is summarized as a radio network controller in a mobile communication system for automatically increasing a transmission rate of user data transmitted by a mobile station via an uplink to a maximum allowable transmission rate, including: a notifier configured to notify an averaging period which is a period for calculating an averaging value of the maximum allowable transmission rates or an averaging value of parameters relating to the maximum allowable transmission rate, or an forgetting factor which is used when calculating the averaging value of the maximum allowable transmission rates or the averaging value of parameters relating to the maximum allowable transmission rate; and a radio resource controller configured to control a radio resource in the radio base station, based on the notified averaging value.

A third aspect of the present invention is summarized as a radio base station in a mobile communication system for automatically increasing a transmission rate of user data transmitted by a mobile station via an uplink to a maximum allowable transmission rate, including an averaging value calculator configured to calculate an averaging value of the maximum allowable transmission rates or an averaging value of the parameters relating to the maximum allowable transmission rates based on an averaging period or a forgetting factor which are notified from a radio network controller, and a signaling unit configured to signal the calculated averaging value to the radio network controller.

A fourth aspect of the present invention is summarized as a radio resource control method in a mobile communication system for determining a transmission rate of user data transmitted by a mobile station via an uplink based on a maximum allowable transmission rate, including: notifying, at a radio network controller, an averaging period or a forgetting factor to a radio base station, and calculating, at the radio base station, an averaging value of the maximum allowable transmission rates or an averaging value of the parameters relating to the maximum allowable transmission rate based on the averaging period and the forgetting factor, signaling, at the radio base station, calculated averaging value to the radio network controller, and controlling, at the radio network controller, the radio resource in the radio base station based on the averaging value signaled from the radio base station.

A fifth aspect of the present invention is summarized as a radio network controller in a mobile communication system for determining a transmission rate of user data transmitted by a mobile station via an uplink based on a maximum allowable transmission rate, including: a notifier configured to notify an averaging period which is a period for calculating an averaging value of the maximum allowable transmission rates or an averaging value of parameters relating to the maximum allowable transmission rate, or an forgetting factor which is used when calculating the averaging value of the maximum allowable transmission rates or the averaging value of parameters relating to the maximum allowable transmission rate; and a radio resource controller configured to control a radio resource in the radio base station, based on the notified averaging value.

A sixth aspect of the present invention is summarized as a radio base station in a mobile communication system for determining a transmission rate of user data transmitted by a mobile station via an uplink based on a maximum allowable transmission rate, including an averaging value calculator configured to calculate an averaging value of the maximum allowable transmission rates or an averaging value of the parameters relating to the maximum allowable transmission rates based on an averaging period or a forgetting factor which are notified from a radio network controller, and a signaling unit configured to signal the calculated averaging value to the radio network controller.

DETAILED DESCRIPTION OF THE INVENTION (Configuration of Mobile Communication System According to First Embodiment of the Present Invention)

Referring to FIGS. 4 to 11, a configuration of a mobile communication system according to a first embodiment of the present invention will be described.

Figure 1:
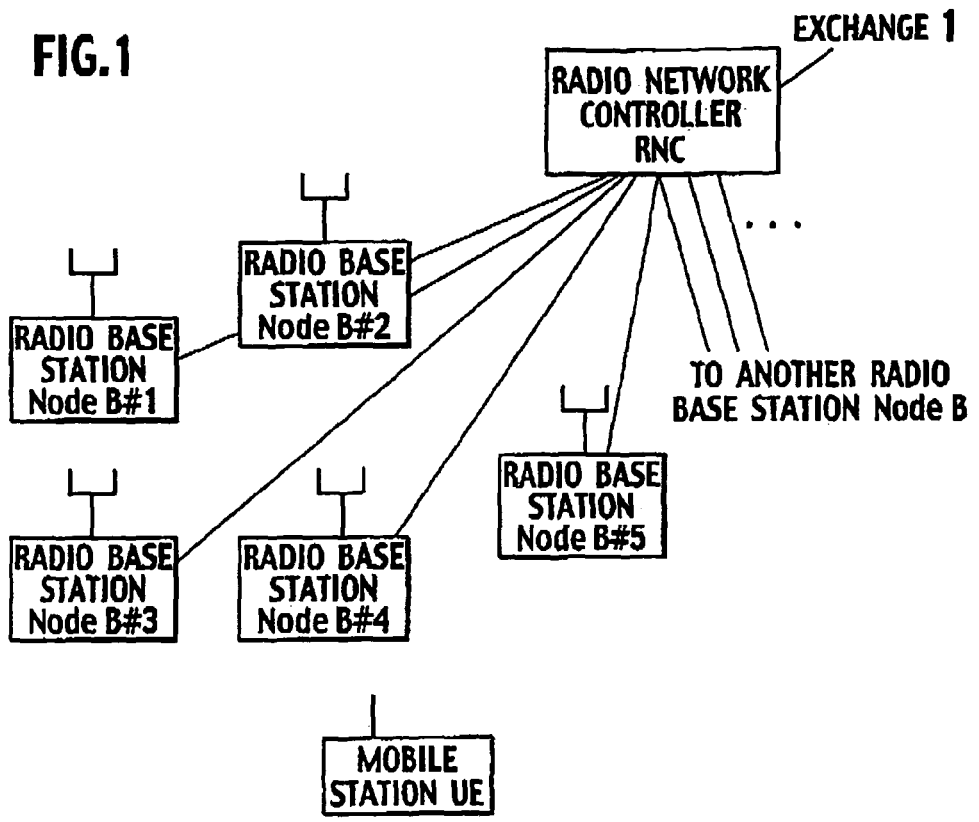
FIG. 1 is diagram of an entire configuration of a general mobile communication system.
Figure 2:
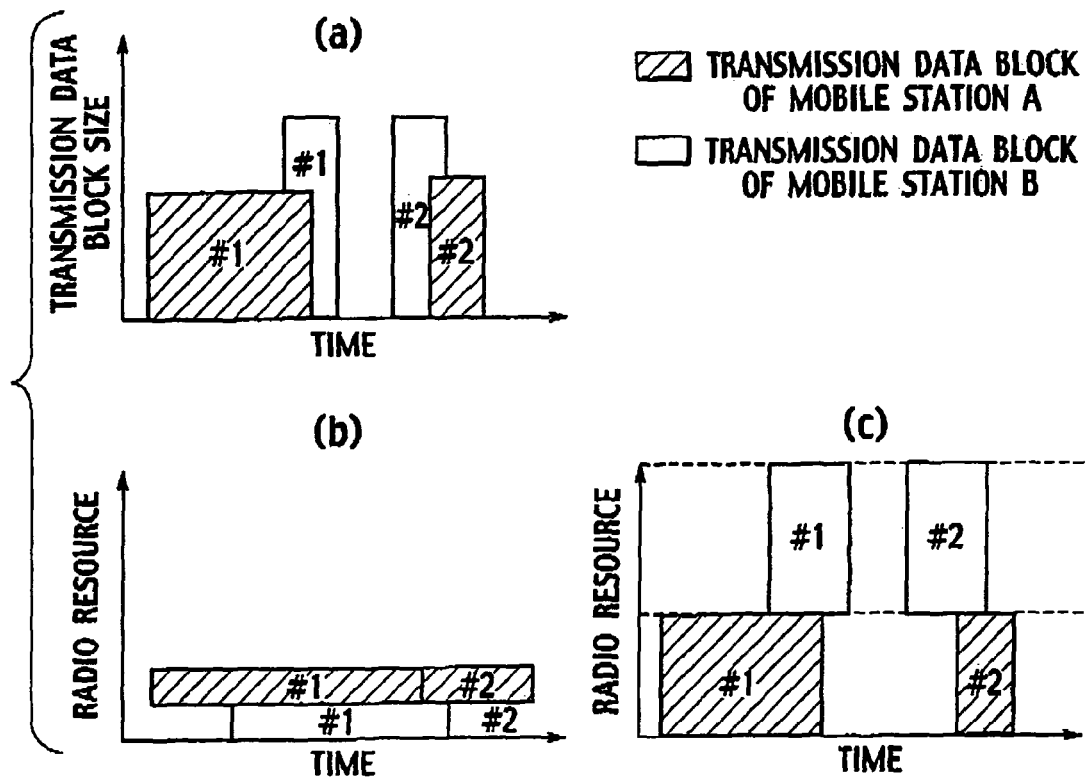
FIGS. 2($a$) to 2($c$) are graphs illustrating operations at the time of burst data transmission in a conventional mobile communication system.

It should be noted that, as shown in FIG. 1, the mobile communication system according to this embodiment is provided with a plurality of radio base stations Node B #1 to Node B #5 and a radio network controller RNC.

The mobile communication system according to this embodiment is configured to determine a transmission rate of user data that is transmitted by a mobile station UE via an uplink, based on the maximum allowable transmission rate.

The mobile communication system according to this embodiment can be configured to automatically increase a transmission rate of user data that is transmitted by a mobile station UE via an uplink to the maximum allowable transmission rate.

In addition, in the mobile communication system according to this embodiment, a "High Speed Downlink Packet Access (HSDPA)" is used in a downlink, and an "Enhanced Uplink (EUL)" is used in an uplink.

It should be noted that in both of the HSDPA and the EUL, retransmission control (N process stop and wait) shall be performed by a "Hybrid Automatic Repeat Request (HARQ)".

Therefore, in an uplink, an "Enhanced Dedicated Physical Channel (E-DPCH)" configured of an "Enhanced Dedicated Physical Data Channel (E-DPDCH)" and an "Enhanced Dedicated Physical Control Channel (E-DPCCH)", and a "Dedicated Physical Channel (DPCH)" configured of a "Dedicated Physical Date Channel (DPDCH)" and a "Dedicated Physical Control Channel (DPCCH)" are used.

Here, the E-DPCCH transmits control data for the EUL such as a transmission format number for defining a transmission format (transmission block size, or the like) of the EDPDCH, HARQ related information (the number of retransmission, or the like), and scheduling related information (transmission power, buffer residence-volume, or the like in the mobile station UE).

In addition, the E-DPDCH is paired with the E-DPCCH, and transmits user data for the mobile station UE based on the control data for the EUL transmitted through the E-DPCCH.

The DPCCH transmits control data such as a pilot symbol that is used for RAKE combining, SIR measurement, or the like, a Transport Format Combination Indicator (TFCI) for identifying a transmission format of uplink DPDCH, and a downlink power control bit in a downlink.

In addition, the DPDCH is paired with the DPCCH, and transmits user data for the mobile station. UE based on the control data transmitted through the DPCCH. However, if user data that should be transmitted does not exist in the mobile station UE, the DPDCH can be configured not to be transmitted.

In addition, in the uplink, a "High Speed Dedicated Physical Control Channel (HS-DPCCH)" which are needed when the HSPDA is applied is also used.

The HS-DPCCH transmits a Channel Quality Indicator (CQI) measured in a downlink and an acknowledge signal (Ack or Nack) for HSDPA.

Figure 4:
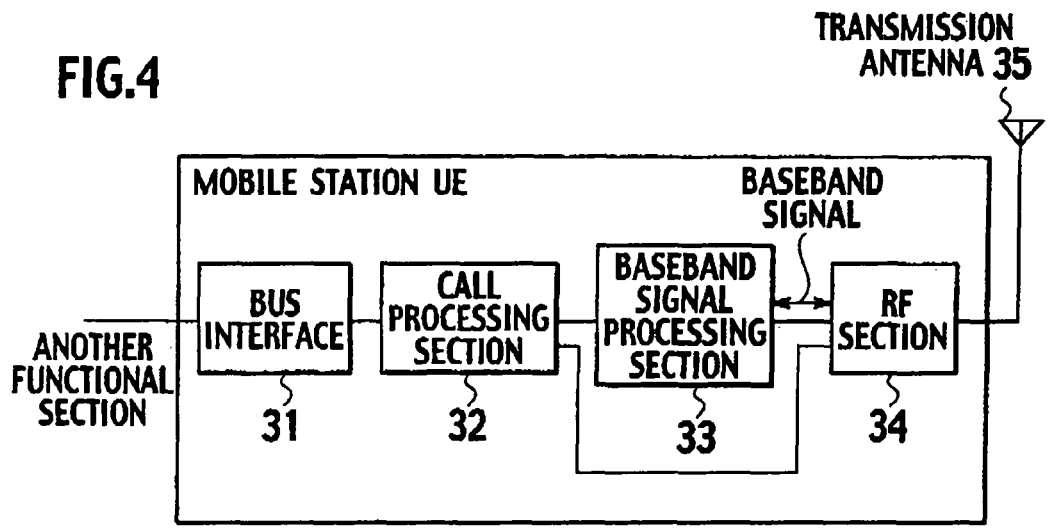
FIG. 4 is a functional block diagram of a mobile station in the mobile communication system according to an embodiment of the present invention.

As shown in FIG. 4, the mobile station UE according to this embodiment is provided with a bus interface 31, a call processing section 32, a baseband processing section 33, a radio frequency (RF) section 34, and a transmission-reception antenna 35.

However, these functions can be independently present as hardware, and can be partly or entirely integrated, or can be configured through a process of software.

The bus interface 31 is configured to forward the user data output from the call processing section 32 to another functional section (for example, an application related functional section).

In addition, the bus interface 31 is configured to forward the user data transmitted from another functional section (for example, the application related functional section) to the call processing section 32.

The call processing section 32 is configured to perform a call control processing for transmitting and receiving the user data.

The baseband signal processing section 33 is configured to transmit the user data to the call processing section 32, the user data acquired by performing, against the baseband signals transmitted from the RF section 34, a layer-1 processing including a despreading processing, a RAKE combining processing, and a "Forward Error Correction (FEC)" decode processing, a "Media Access Control (MAC)" processing including a MAC-e processing and a MAC-d processing, and a "Radio Link Control (RLC)" processing.

In addition, the baseband signal processing section 33 is configured to generate the baseband signals by performing the RLC processing, the MAC processing, or the layer-1 processing against the user data transmitted from the call processing section 32 so as to transmit the baseband signals to the RF section 34.

Detailed description of the functions of the baseband signal processing section 33 will be given later.

The RF section 34 is configured to generate baseband signals by performing the detection processing, the filtering processing, the quantization processing, or the like against radio frequency signals received through the transmission-reception antenna 35, so as to transmit the generated baseband signals to the baseband signal processing section 33.

In addition, the RF section 34 is configured to convert the baseband signals transmitted from the baseband signal processing section 33 to the radio frequency signals.

Figure 5:
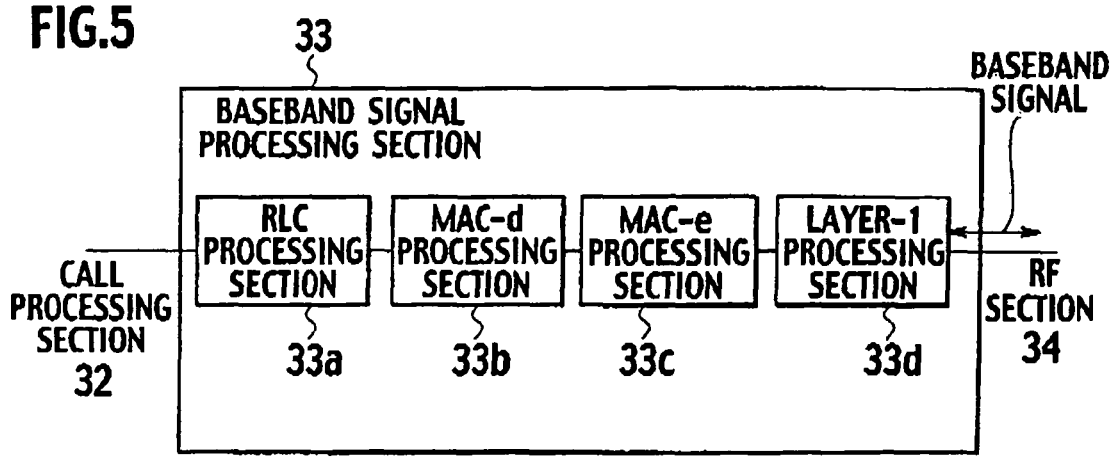
FIG. 5 is a functional block diagram of a baseband signal processing section of the mobile station in the mobile communication system according to the embodiment of the present invention.

As shown in FIG. 5, the baseband signal processing section 33 is provided with a RLC processing section 33$a$, a MAC-d processing section 33$b$, a MAC-e processing section 33$c$, and a layer-1 processing section 33$d$.

The RLC processing section 33$a$ is configured to transmit, to the MAC-d processing section 33$b$, the user data transmitted from the call processing section 32 by performing a processing (RLC processing) in an upper layer of a layer-2 against the user data.

The MAC-d processing section 33$b$ is configured to create a transmission format in the uplink by granting a channel identifier header based on the logical channel the data originates from.

Figure 6:
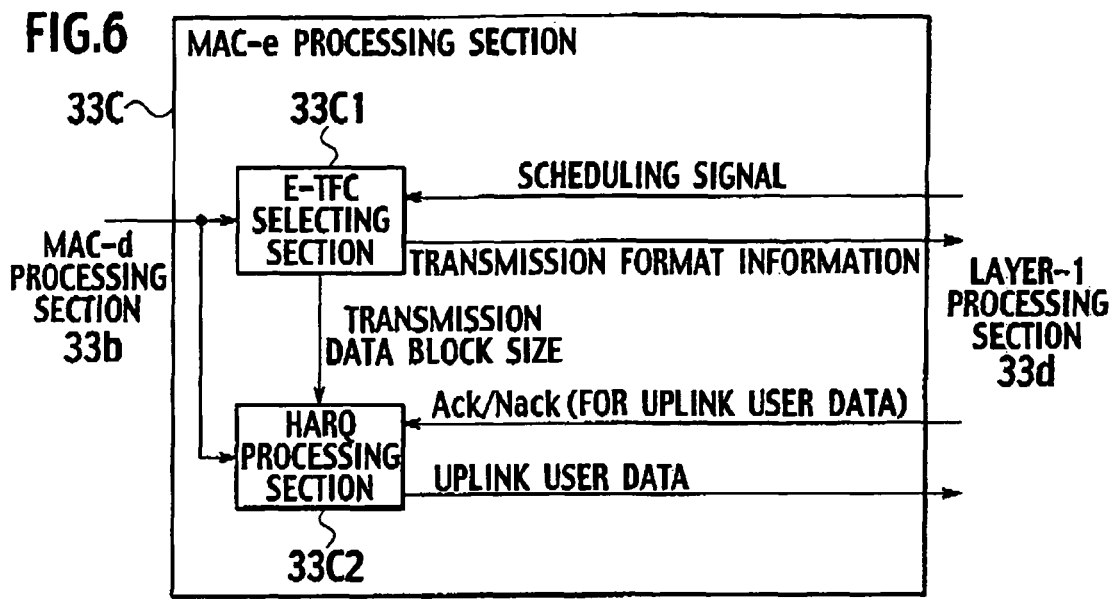
FIG. 6 is a functional block diagram of a MAC-e processing section of the baseband signal processing section in the mobile station of the mobile communication system according to the embodiment of the present invention.

As shown in FIG. 6, the MAC-e processing section 33$c$ is provided with an Enhanced Transport Format Combination (E-TFC) selecting section 33$c1$ and an HARQ controlling section 33$c2$.

The E-TFC selecting section 33$c1$ is configured to determine a transmission format (E-TFC) of the E-DPDCH, based on scheduling signals transmitted from the radio base station Node B.

In addition, the E-TFC selecting section 33c1 is configured to transmit transmission format information on the determined transmission format (that is, a transmission data block size, an transmission power ratio between the E-DPDCH and the DPCCH, or the like) to the layer-1 processing section 33d, and also to transmit the determined transmission data block size or the transmission power ratio to the HARQ controlling section 33c2.

Here, the scheduling signals include the maximum allowable transmission rate of user data in the mobile station UE (for example, the maximum allowable transmission data block size, a maximum value of the transmission power ratio between the E-DPDCH and the DPCCH (maximum allowable transmission power ratio), or the like), or a parameter relating to the maximum allowable transmission rate.

Unless particularly described in this specification, the maximum allowable transmission rate includes a parameter relating to the maximum allowable transmission rate.

Such a scheduling signal is information that is signaled in the cell where the mobile station UE is located, and includes control information for all the mobile stations located in the cell, or a specific group of the mobile stations located in the cell.

Here, the E-TFC selecting section 33c1 is configured to determine the transmission rate of user data in the uplink based on the maximum allowable transmission rate notified by the scheduling signals from the radio base station Node B.

To be more specific, the E-TFC selecting section 33c1 can be configured to increase the transmission rate of user data in the uplink to the maximum allowable transmission rate notified by the scheduling signals from the radio base station Node B.

The HARQ controlling section 33c2 is configured to perform process control for the "N process stop and wait", so as to transmit the user data in the uplink based on an acknowledge signal (Ack/Nack for uplink data) transmitted from the radio base station Node B.

Specifically, the HARQ 33c2 is configured to determine whether or not the receive processing of uplink user data by the radio base station Node B has been successful based on the acknowledge signal (Ack/Nack for uplink data) to be transmitted by the radio base station Node B.

Then, the HARQ controlling section 33c2 is configured to transmit new data on the HARQ process if the received acknowledge signal to the HARQ process from the radio base station Node B was an Ack (data was successfully received), or retransmission data on the HARQ process if the received acknowledge signal to the HARQ process from the radio base station Node B was an Nack (data was not successfully received).

Figure 7:
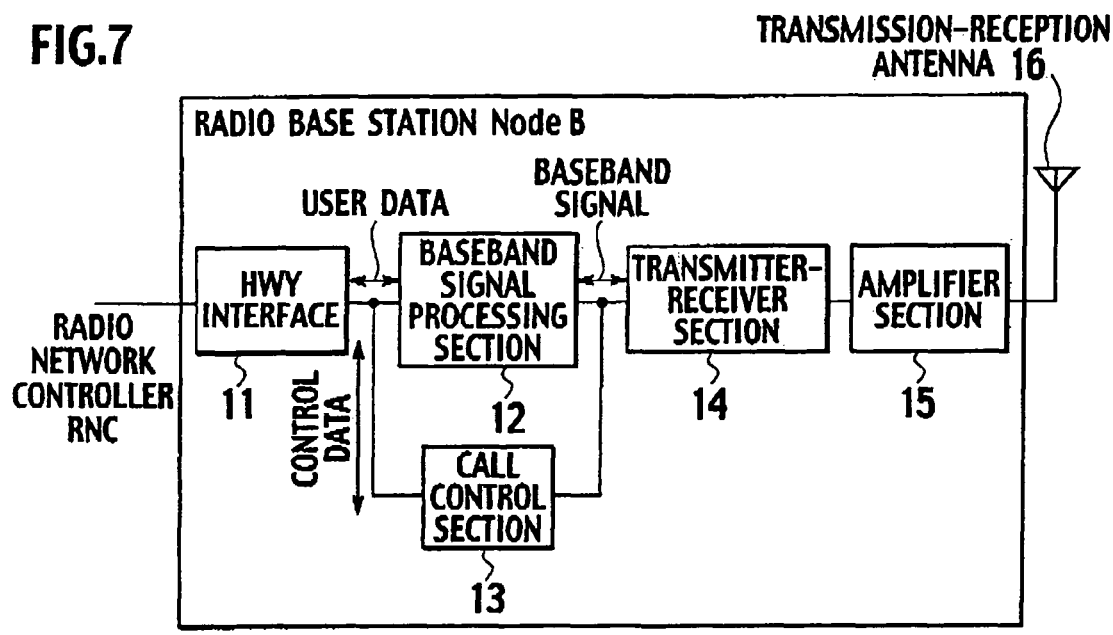
FIG. 7 is a functional block diagram of a radio base station of the mobile communication system according to the embodiment of the present invention.

As shown in FIG. 7, the radio base station Node B according to this embodiment is provided with an HWY interface 11, a baseband signal processing section 12, a call control section 13, at least one transmitter-receiver section 14, at least one amplifier section 15, and at least one transmission-reception antenna 16.

The HWY interface 11 is an interface with a radio network controller RNC. Specifically, the HWY interface 11 is configured to receive user data transmitted from the radio network controller RNC to a mobile station UE via a downlink, so as to enter the user data to the baseband signal processing section 12.

In addition, the HWY interface 11 is configured to receive control data for the radio base station Node B from the radio network controller RNC, so as to enter the received control data to the call control section 13.

In addition, the HWY interface 11 is configured to acquire, from the baseband signal processing section 12, the user data included in the uplink signals which are received from a mobile station UE via an uplink, so as to transmit the acquired user data to the radio network controller RNC.

Further, the HWY interface 11 is configured to acquire the control data for the radio network controller RNC from the call control section 13, so as to transmit the acquired control data to the radio network controller RNC.

The baseband signal processing section 12 is configured to generate baseband signals by performing the MAC-e processing and the layer-1 processing against the user data acquired from the HWY interface 11, so as to forward the generated baseband signals to the transmitter-receiver section 14.

Here, the MAC-e processing in the downlink includes an HARQ processing, a scheduling processing, a transmission rate control processing, or the like.

In addition, the layer-1 processing in the downlink includes a channel coding processing of user data, a spreading processing, or the like.

In addition, the baseband signal processing section 12 is configured to extract user data by performing the layer-1 processing and the MAC-e processing against the baseband signals acquired from the transmitter-receiver section 14, so as to forward the extracted user data to the HWY interface 11.

Here, the MAC-e processing in the uplink includes the HARQ processing, the scheduling processing, the transmission rate control processing, a header disposal processing, or the like.

In addition, the layer-1 processing in the uplink includes the despreading processing, the RAKE combining processing, the error correction decode processing, or the like.

Detailed description of the functions of the baseband signal processing section 12 will be given later.

In addition, the call control section 13 is configured to perform the call control processing, based on the control data acquired from the HWY interface 11.

The transmitter-receiver section 14 is configured to perform processing of converting baseband signals, which are acquired from the baseband signal processing section 12, to radio frequency signals (downlink signals), so as to transmit the radio frequency signals to the amplifier section 15.

In addition, the transmitter-receiver 14 is configured to perform processing of converting the radio frequency signals (uplink signals), which are acquired from the amplifier section 15, to the baseband signals, so as to transmit the baseband signals to the baseband signal processing section 12.

The amplifier section 15 is configured to amplify the downlink signals acquired from the transmitter-receiver section 14, so as to transmit the amplified downlink signals to the mobile station UE via the transmission-reception antenna 16.

In addition, the amplifier 15 is configured to amplify the uplink signals received by the transmission-reception antenna 16, so as to transmit the amplified uplink signals to the transmitter-receiver section 14.

Figure 8:
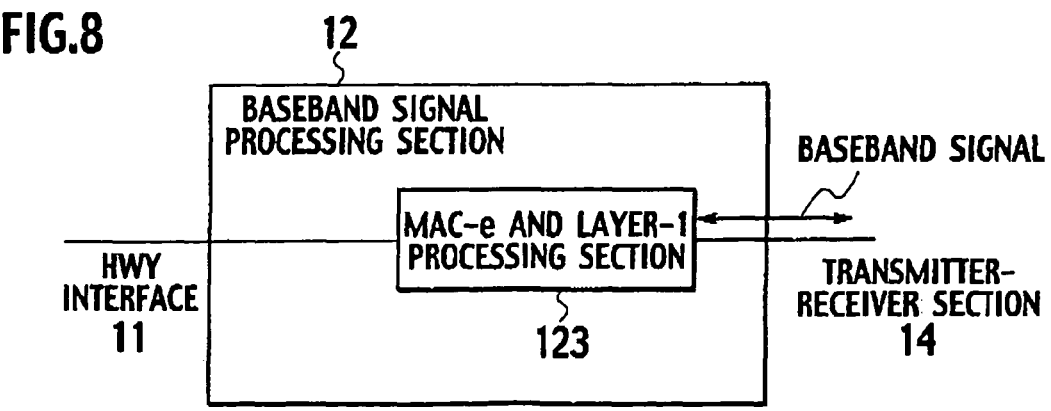
FIG. 8 is a functional block diagram of the baseband processing section in the radio base station of the mobile communication system according to the embodiment of the present invention.

As shown in FIG. 8, the baseband signal processing section 12 includes a MAC-e and layer-1 processing section 123.

The MAC-e and layer-1 processing section 123 is configured to perform, against the baseband signals acquired from the transmitter-receiver section 14, the despreading processing, the RAKE combining processing, the error correction decode processing, the HARQ processing, or the like.

However, these functions are not clearly divided per hardware, and can be obtained by software.

Figure 9:
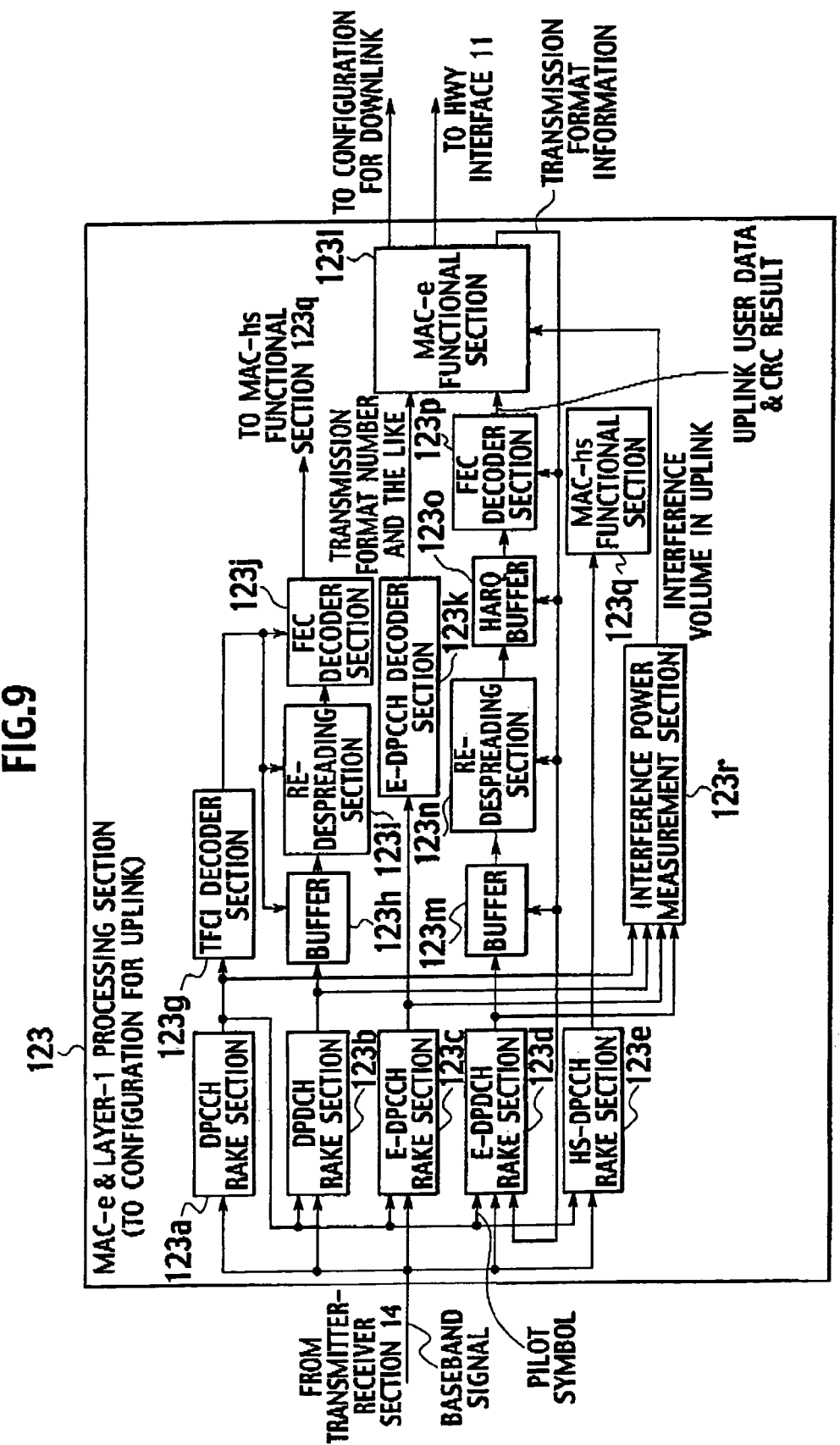
FIG. 9 is a functional block diagram of the MAC-e and layer-1 processing section (configured for an uplink) in the baseband signal processing section in the radio base station of the communication system according to the embodiment of the present invention.

As shown in FIG. 9, the MAC-e and layer-1 processing section (configuration for the uplink) 123 is provided with a DPCCH RAKE section 123a, a DPDCH RAKE section 123b, an E-DPCCH RAKE section 123c, an E-DPDCH RAKE section 123d, an HS-DPCCH RAKE section 123e, a Transport Format Combination Indicator (TFCI) decoder section 123g, buffers 123h and 123m, re-despreading sections 123i and 123n, FEC decoder sections 123j and 123p, an E-DPCCH decoder section 123k, a MAC-e functional section 123l, an HARQ buffer 123o, a MAC-hs functional section 123q, and an interference power measurement section 123r.

The E-DPCCH RAKE section 123c is configured to perform, against the E-DPCCH in the baseband signals transmitted from the transmitter-receiver section 14, the despreading processing, and the RAKE combining processing using a pilot symbol included in the DPCCH.

The E-DPCCH decoder section 123k is configured to acquire transmission format number related information, HARQ related information, scheduling related information, or the like, by performing the decode processing against the RAKE combining outputs of the E-DPCCH RAKE section 123c, so as to enter the information to the MAC-e functional section 123l.

The E-DPDCH RAKE section 123d is configured to perform, against the E-DPDCH in the baseband signals transmitted from the transmitter-receiver section 14, the despreading processing using the transmission format information (the number of codes) transmitted from the MAC-e functional section 123l and the RAKE combining processing using the pilot symbol included in the DPCCH.

The buffer 123m is configured to store the RAKE combining outputs of the E-DPDCH RAKE section 123d based on the transmission format information (the number of symbols) transmitted from the MAC-e functional section 123l.

The re-despreading section 123n is configured to perform the despreading processing against the RAKE combining outputs of the E-DPOCH RAKE section 123d which is stored in the buffer 123m, based on the transmission format information (spreading factor) transmitted from the MAC-e functional section 123l.

The HARQ buffer 123o is configured to store the despreading processing outputs of the re-despreading section 123n, based on the transmission format information transmitted from the MAC-e functional section 123l.

The FEC decoder section 123p is configured to perform an error correction decode processing (the FEC decoding processing) against the despreading processing outputs of the re-despreading section 123n, which is stored in the HARQ buffer 123o, based on the transmission format information (transmission data block size) transmitted from the MAC-e functional section 123l.

The interference power measurement section 123r is configured to measure an interference volume (noise rise) in the uplink such as interference power by a mobile station UE of which the radio base station Node B provides service, and the entire interference power.

Here, the noise rise is a ratio between the interference power in a predetermined channel within a predetermined frequency and noise power (thermal noise power or noise power from the outside of the mobile communication system) within the predetermined frequency (i.e., a receiving signal level from a noise floor).

In other words, the noise rise is a received interference power offset that a receiving level in communication has against a receiving level (noise floor) in non-communication.

The MAC-e functional section 123l is configured to calculate and output the transmission format information (the number of codes, the number of symbols, spreading factor, transmission data block size, and the like) based on the transmission format number related information, the HARQ related information, the scheduling related information, and the like, which are acquired from the E-DPCCH decoder section 123k.

Figure 10:
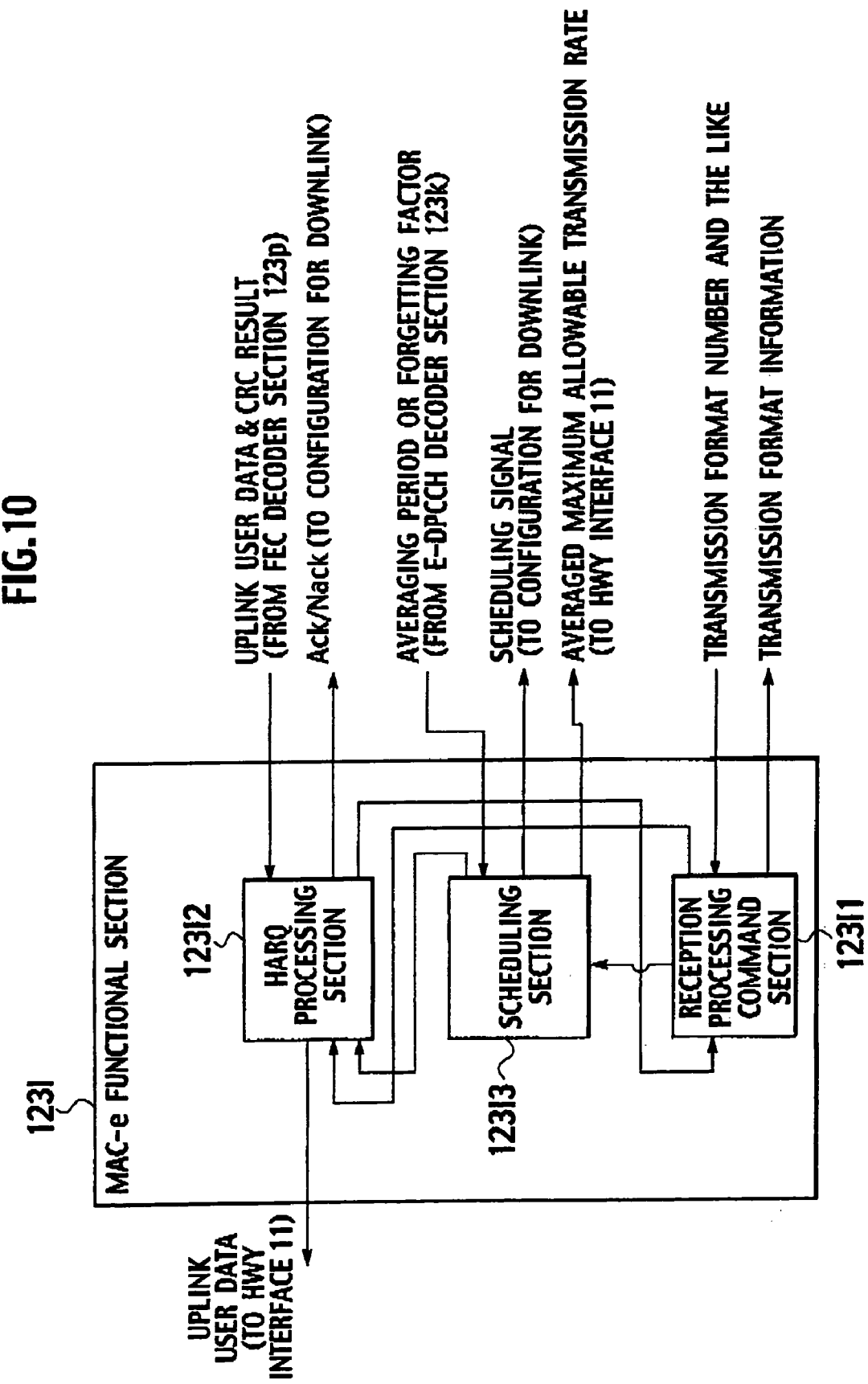
FIG. 10 is a functional block diagram of a MAC-e functional section of the MAC-e and layer-1 processing section (configured for the uplink) in the baseband signal processing section in the radio base station of the mobile communication system according to the embodiment of the present invention.

In addition, as shown in FIG. 10, the MAC-e functional section 123l is provided with a receive processing command section 123l/1, an HARQ controlling section 123l/2, and a scheduling section 123l/3.

The receive processing command section 123l/1 is configured to transmit the transmission format number related information, the HARQ related information, and the scheduling related information, which are entered from the E-DPCCH decoder section 123k, to the HARQ controlling section 123l/2.

In addition, the receive processing command section 123l/1 is configured to transmit, to the scheduling section 123l/3, the scheduling related information entered form the E-DPCCH decoder section 123k.

Further, the receive processing command section 123l/1 is configured to output the transmission format information corresponding to the transmission format number entered from the E-DPCCH decoder section 123k.

The HARQ controlling section 123l/2 is configured to determine whether or not the receive processing of uplink user data has been successful, based on the CRC result entered from the FEC decoder section 123p.

Then, the HARQ controlling section 123l/2 is configured to generate an acknowledge signal (Ack or Nack), based on the determined result, so as to transmit the generated acknowledge signal to the configuration for the downlink of the baseband signal processing section 12.

In addition, the HARQ controlling section 123l/2 is configured to transmit the uplink user data entered from the FEC decoder section 123p to the radio network controller RNC, when the above-described determined result has been successful.

In addition, the HARQ controlling section 123l/2 is configured to clear soft decision values stored in the HARQ buffer 123o, when the above-described determined result has been successful.

On the other hand, the HARQ controlling section 123l/2 is configured to store, in the HARQ buffer 123o, the uplink user data, when the above-described determined result has not been successful.

In addition, the HARQ controlling section 123l/2 is configured to forward the above-described determined result to the receive processing command section 123l/1.

The receive processing control command section 123l/1 is configured to notify the E-DPDCH RAKE section 123d and the buffer 123m of an hardware resource that should be prepared for the following transmission time interval (TTI), based on the received determined result, so as to perform notification for reserving the resource in the HARQ buffer 123o.

In addition, when the uplink user data is stored in the buffer 123m, the receive processing command section 123l/1 is configured to designate the HARQ buffer 123o and the FEC decoder section 123p to perform the FEC decoding processing after adding the uplink user data, which is stored in the HARQ buffer 123o, in a process corresponding to the TTI and a newly received uplink user data, per TTI.

In addition, the scheduling section 123l/3 is configured to designate the configuration for the downlink of the baseband signal processing section 12 so as to notify the scheduling signals including the maximum allowable transmission rate (maximum allowable transmission data block size, maximum allowable transmission power ratio, or the like), based on radio resources in the uplink of the radio base station Node B, interference volume (noise rise) in the uplink, or the like.

Specifically, the scheduling section 123/3 is configured to determine the maximum allowable transmission rate based on the scheduling related information (radio resources in the uplink) transmitted from the E-DPCCH decoder section 123k or the interference volume in the uplink transmitted-from the interference power measurement section 123r, so as to control the transmission rate of user data in a communicating mobile station in communication.

Detailed descriptions of a control method based on the hardware resources and a control method based on the interference volume in the uplink will be given below.

In the control method based on the hardware resources, the scheduling section 123/3 is configured to signal the maximum allowable transmission rate through an E-AGCH (Enhanced Absolute Grant Channel) to the mobile station UE connected to a cell under the control of the radio base station Node B.

When the transmission rate of user data in the mobile station UE connected to the cell under the control of the radio base station Node B increases and the hardware resources becomes insufficient, the scheduling section 123/3 lowers the maximum allowable transmission rate so that shortage of the hardware resources can be avoided.

On the other hand, when the hardware resources have spaces in such a case when the user data transmission in the mobile station UE connected to the cell under the control of the radio base station Node B is completed, or the like, the scheduling section 123/3 again increases the maximum allowable transmission rate.

In addition, in the control method based on the interference volume in the uplink, the scheduling section 123/3 is configured to signal the maximum allowable transmission rate through the E-AGCH to the mobile station UE connected to the cell under the control of the radio base station Node B.

Figure 3:
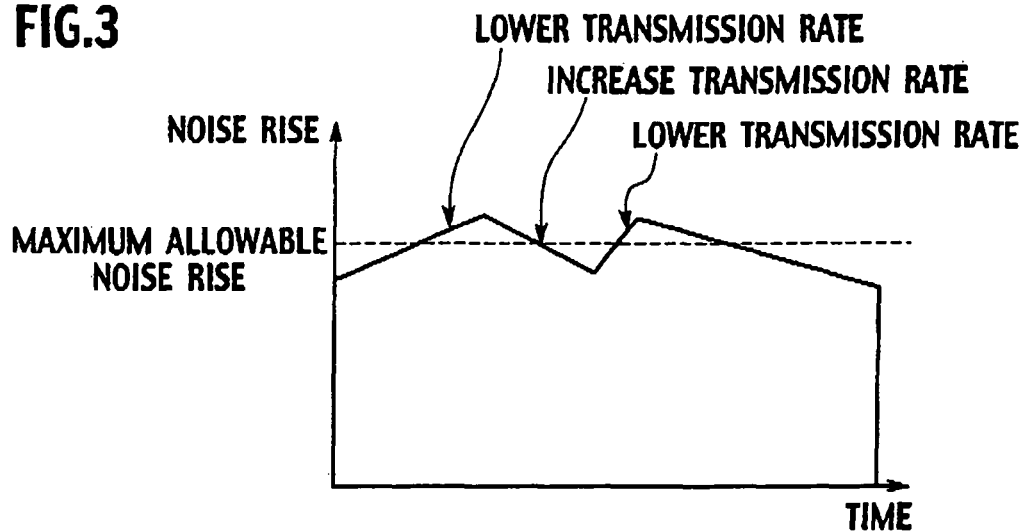
FIG. 3 is a graph illustrating operations at the time of controlling transmission rate in an uplink in the conventional mobile communication system.

When the transmission rate of user data in the mobile station UE connected to the cell under the control of the radio base station Node B increases and the interference volume (for example, noise rise) in the uplink exceeds an allowable value (for example, maximum allowable noise rise), the scheduling section 123/3 lowers the maximum allowable transmission rate so that the interference volume in the uplink can fall within a range of the allowable value (see, FIG. 3).

On the other hand, when the interference volume (for example, noise rise) in the uplink falls within the range of the allowable value (for example, maximum allowable noise rise) and there is a space therein in the case when the user data transmission in the mobile station UE connected to the cell under the control of the radio base station Node B is completed, or the like, the scheduling section 123/3 again increases the maximum allowable transmission rate (see, FIG. 3).

Further, the scheduling section 123/3 is configured to receive an averaging period or a forgetting factor which is notified from the radio network controller RNC, to calculate an averaging value of the maximum allowable transmission rates based on the averaging period or the forgetting factor, and to signal the calculated averaging value to the radio network controller RNC.

To be more specific, the scheduling section 123/3 is configured to calculate an averaging value of the maximum allowable transmission rates in the averaging period which is notified by the radio network controller RNC, and to signal the calculated averaging value to the radio network controller RNC.

For example, when the forgetting factor which is notified by the radio network controller RNC is "0.9", the scheduling section 123/3 is configured to calculate the averaging value of the maximum allowable transmission rates at the current moment using "(previously calculated averaging value×0.9) +(the maximum allowable transmission rate at the current moment)", and signal the calculated averaging value to the radio network controller RNC.

The scheduling section 123/3 can be configured to signal the maximum allowable transmission rate to the radio network controller RNC autonomously based on a predetermined event trigger, or signal the maximum allowable transmission rate to the radio network controller RNC periodically.

The radio network controller RNC according to this embodiment is an apparatus located in an upper level of the radio base station Node B, and is configured to control radio communications between the radio base station Node B and the mobile station UE.

Figure 11:
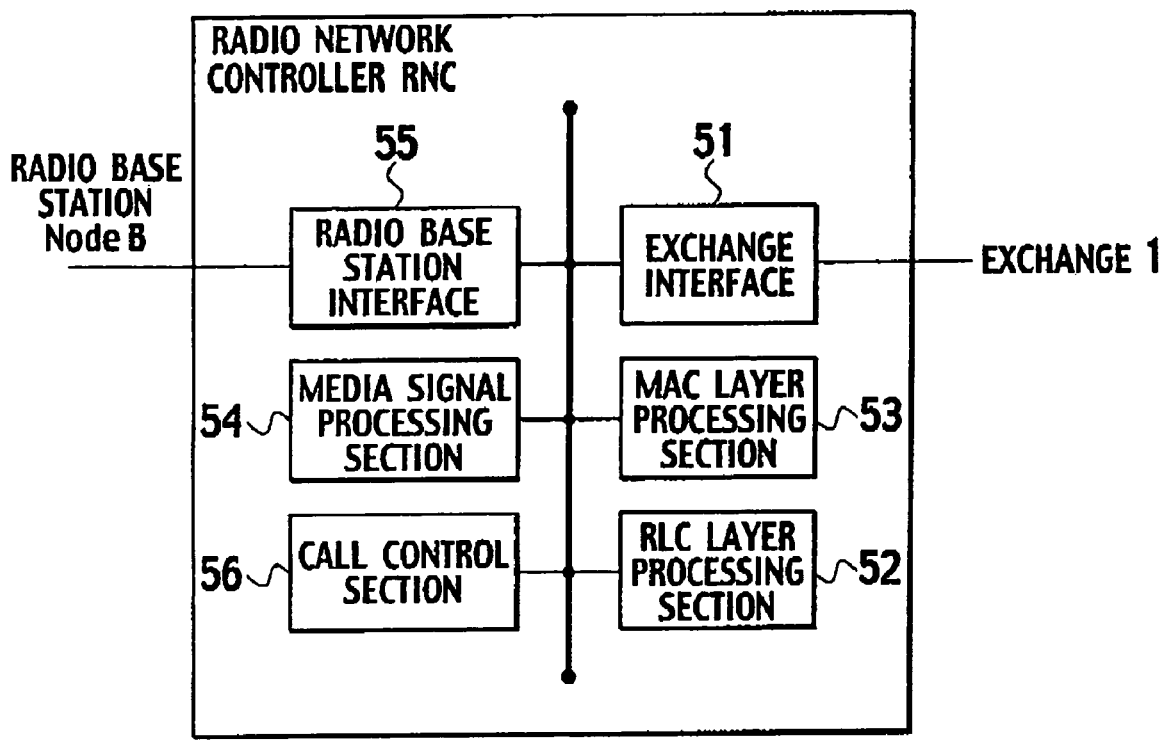
FIG. 11 is a functional block diagram of a radio network controller of the mobile communication system according to the embodiment of the present invention.

As shown in FIG. 11, the radio network controller RNC according to this embodiment is provided with an exchange interface 51, a Radio Link Control (RLC) layer processing section 52, a MAC layer processing section 53, a media signal processing section 54, a radio base station interface 55, and a call control section 56.

The exchange interface 51 is an interface with an exchange 1, and is configured to forward the downlink signals transmitted from the exchange 1 to the RLC layer processing section 52, and to forward the uplink signals transmitted from the RLC layer processing section 52 to the exchange 1.

The RLC layer processing section 52 is configured to perform an RLC (Radio Link Control) sub-layer processing such as a combining processing of a header such as a sequence number or a trailer.

The RLC layer processing section 52 is also configured to transmit the uplink signals to the exchange interface 51 and to transmit the downlink signals to the MAC layer processing section 53, after the RLC sub-layer processing is performed.

The MAC layer processing section 53 is configured to perform a MAC layer processing such as a priority control processing or a header granting processing.

The MAC layer processing section 53 is also configured to transmit the uplink signals to the RLC layer processing section 52 and to transmit the downlink signals to the radio base station interface 55 (or a media signal processing section 54), after the MAC layer processing is performed.

The media signal processing section 54 is configured to perform a media signal processing against voice signals or real time image signals.

The media signal processing section 54 is also configured to transmit the uplink signals to the MAC layer processing section 53 and to transmit the downlink signals to the radio base station interface 55, after the media signal processing is performed.

The radio base station interface 55 is an interface with the radio base station Node B. The radio base station interface 55 is configured to forward the uplink signals transmitted from the radio base station Node B to the MAC layer processing section 53 (or the media signal processing section 54) and to forward the downlink signals transmitted from the MAC layer processing section 53 (or the media signal processing section 54) to the radio base station Node B.

The call control section 56 is configured to perform a radio resource control processing, a channel setup and open processing by the layer-3 signaling, or the like.

Here, the radio resource control processing includes a call admission control processing, a handover processing, or the like.

The call control section 56 is configured to inquire a maximum allowable transmission rate which is signaled in cell under the control of the radio base station Node B, as information required for performing the radio resource control processing, to the radio base station Node B.

The call control section 56 can be configured not to admit a call requesting for the setting of a new E-DPCH, or not to perform the handover of E-DPCH to the cell, when the maximum allowable transmission rate inquired to the radio base station Node B is lower than the predetermined threshold.

Further, the call control section 56 can be configured to acquire the maximum allowable transmission rate which is autonomously signaled from the radio base station Node B based on the predetermined event trigger, or to acquire the maximum allowable transmission rate which is periodically signaled from the radio base station Node B.

(Operations of Mobile Communication System According to First Embodiment of the Present Invention)

Figure 12:
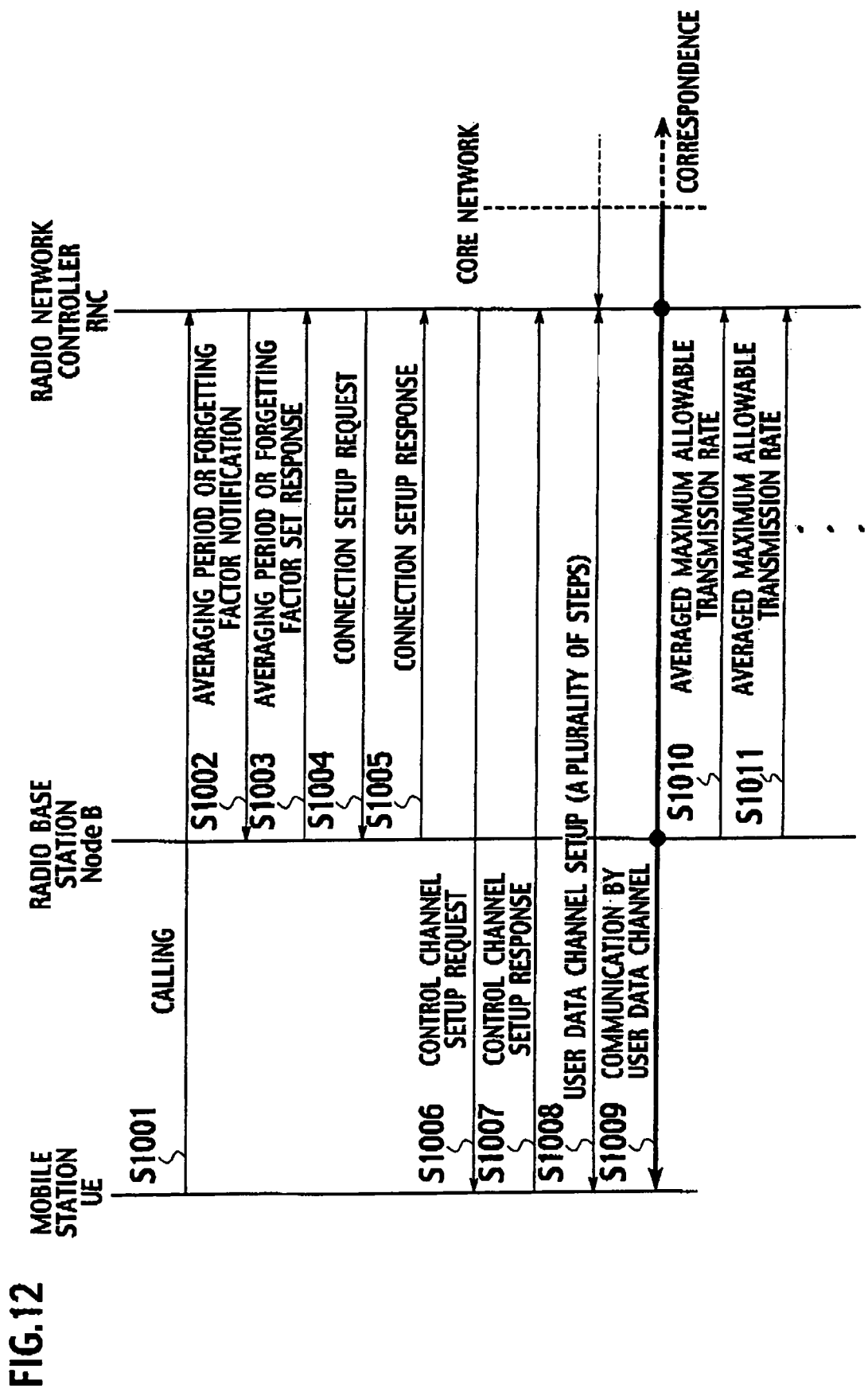
FIG. 12 is a sequence diagram showing operations of the mobile communication system according to the embodiment of the present invention.

Referring to FIG. 12, operations of the mobile communication system according to the first embodiment of the present invention are described below.

As shown in FIG. 12, in step S1001, a mobile station UE transmits a transmission request to a radio network controller RNC.

In step S1002, the radio network controller RNC notifies an averaging period or a forgetting factor to the radio base station Node B.

In step S1003, the radio base station Node B responds to the radio network controller RNC that the notified averaging period or forgetting factor is set.

In step S1004, the radio network controller RNC transmits a connection set request including the request for signaling the maximum allowable transmission rate to the radio base station Node B.

Here, the radio network controller RNC can transmit the connection set request and the request for signaling the maximum allowable transmission rate to the radio base station Node B, separately.

In step S1005, the radio base station Node B sets a radio connection between the mobile station UE and the radio base station Node B based on the connection set request, and transmits the response which indicate that the radio connection have been set, to the radio network controller RNC.

In step S1006, the radio network controller RNC transmits a control channel connection set request to the mobile station UE. Here, the control channel connection set request includes information for setting the control channel (including frequency information).

In step S1007, the mobile station UE sets a control channel between the mobile station UE and the radio network controller RNC based on the control channel connection set request.

Then, the mobile station UE transmits a control channel connection set response which indicate that the connection between the mobile station UE and the radio network controller RNC have been set, to the radio network controller RNC.

In step S1008, a user data channel is set between the radio network controller RNC and the mobile station UE. In step S1009, a communication using the set user data channel starts.

Here, the mobile station UE determines a transmission rate of an uplink user data based on a maximum allowable transmission rate, which is regularly notified from the radio base station Node B through E-AGCH.

To be more specific, the mobile station UE can automatically increase a transmission rate of an uplink user data to a maximum allowable transmission rate, which is regularly notified from the radio base station Node B through E-AGCH.

In addition, the radio base station Node B signals an averaging maximum allowable transmission rate, which is calculated based on the averaging period or the forgetting factor, to the radio network controller RNC, based on the predetermined event trigger, or regularly.

(Actions and Effects of Mobile Communication System According to First Embodiment of the Present Invention)

According to the mobile communication system in accordance with the first embodiment of the present invention, it becomes possible to set an averaging period or a forgetting factor suited to a calculation processing capability and a control processing capability in the radio network controller RNC as well as the radio base station Node B, so that flexible mobile communication system can be constructed.

(Modified Example)

Figure 13:
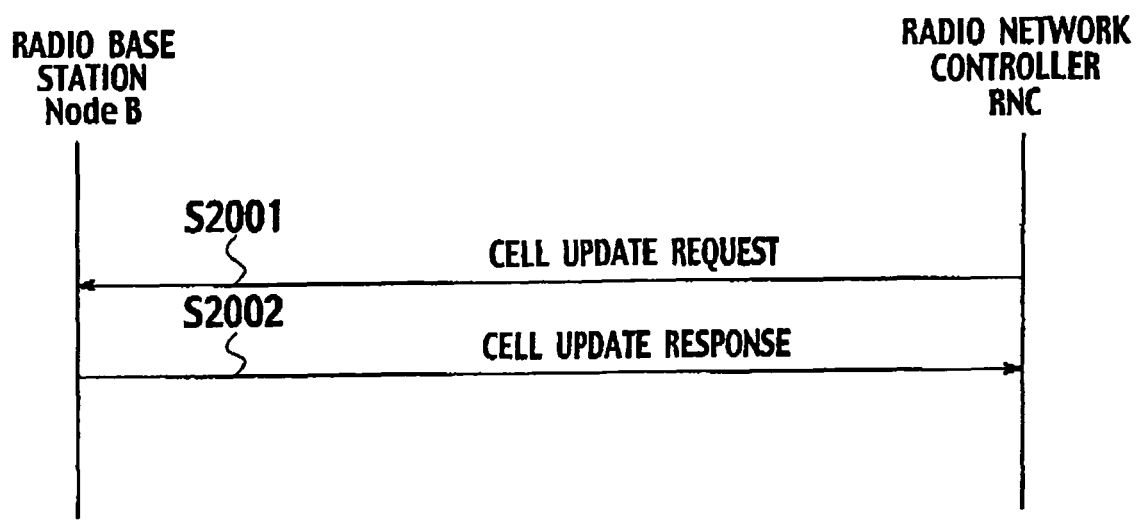
FIG. 13 is a sequence diagram showing operations of the mobile communication system according to the modified example of the present invention.

Referring to FIG. 13, operations of the mobile communication system according to the modified example of the present invention are described below.

In the mobile communication system according to the modified example, the radio network controller RNC is configured to change the averaging period of the maximum allowable transmission rate or the forgetting factor of the maximum allowable transmission rate in each cell, when a new radio base station Node B is set or at the time of cell update which is performed regularly.

As shown in FIG. 13, in step S2001, the radio network controller RNC requests the radio base station Node B to update the averaging period or the forgetting factor in the specific cell, by a cell update request.

In step S2002, the radio base station Node B updates the averaging period or the forgetting factor in the specific cell based on the cell update request, and transmits a response which indicates that the cell update is performed, to the radio network controller RNC.

Further, according to the present invention, it becomes possible to provide the radio resource control method, the radio network controller, and the radio base station which can perform the high quality radio resource control without increasing the traffic volume between the radio network controller and the radio base station as well as the control load in the radio network controller.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. A radio resource control method in a mobile communication system for automatically increasing a transmission rate of user data transmitted by a mobile station via an uplink to a maximum allowable transmission rate, comprising: notifying, at a radio network controller, an averaging period and a forgetting factor to a radio base station; calculating, at the radio base station, an averaging value of the maximum allowable transmission rates or an averaging value of parameters relating to the maximum allowable transmission rate, based on the averaging period and the forgetting factor; signaling, at the radio base station, the calculated averaging value to the radio network controller; and controlling, at the radio network controller, a radio resource in the radio base station, based on the calculated averaging value.

2. A radio network controller in a mobile communication system for automatically increasing a transmission rate of user data transmitted by a mobile station via an uplink to a maximum allowable transmission rate, comprising:

a notifier configured to notify an averaging period which is a period for calculating an averaging value of the maximum allowable transmission rates or an averaging value of parameters relating to the maximum allowable transmission rate, and a forgetting factor which is used when calculating the averaging value of the maximum allowable transmission rates or the averaging value of parameters relating to the maximum allowable transmission rate; and a radio resource controller configured to control a radio resource in the radio base station, based on the notified averaging value.

3. A radio base station in a mobile communication system for automatically increasing a transmission rate of user data transmitted by a mobile station via an uplink to a maximum allowable transmission rate, comprising:

an averaging value calculator configured to calculate an averaging value of the maximum allowable transmission rates or an averaging value of parameters relating to the maximum allowable transmission rate, based on an averaging period and a forgetting factor which is notified by a radio network controller; and a signaling unit configured to signal the calculated averaging value to the radio network controller.

4. A radio resource control method in a mobile communication system for determining a transmission rate of user data transmitted by a mobile station via an uplink based on a maximum allowable transmission rate, comprising: notifying, at a radio network controller, an averaging period and a forgetting factor to a radio base station; calculating, at the radio base station, an averaging value of the maximum allowable transmission rates or an averaging value of parameters relating to the maximum allowable transmission rate, based on the averaging period and the forgetting factor; signaling, at the radio base station, the calculated averaging value to the radio network controller; and controlling, at the radio network controller, a radio resource in the radio base station, based on the calculated averaging value.

5. A radio network controller in a mobile communication system for determining a transmission rate of user data transmitted by a mobile station via an uplink based on a maximum allowable transmission rate, comprising:

a notifier configured to notify an averaging period which is a period for calculating an averaging value of the maximum allowable transmission rates or an averaging value of parameters relating to the maximum allowable transmission rate, and a forgetting factor which is used when calculating the averaging value of the maximum allowable transmission rates or the averaging value of parameters relating to the maximum allowable transmission rate; and a radio resource controller configured to control a radio resource in the radio base station, based on the notified averaging value.

6. A radio base station in a mobile communication system for determining a transmission rate of user data transmitted by a mobile station via an uplink based on a maximum allowable transmission rate, comprising:

an averaging value calculator configured to calculate an averaging value of the maximum allowable transmission rates or an averaging value of parameters relating to the maximum allowable transmission rate, based on an averaging period and a forgetting factor which is notified by a radio network controller; and a signaling unit configured to signal the calculated averaging value to the radio network controller.

* * * * *